(12) United States Patent
Hsu et al.

(10) Patent No.: US 7,984,265 B2
(45) Date of Patent: Jul. 19, 2011

(54) EVENT ADDRESS REGISTER HISTORY BUFFERS FOR SUPPORTING PROFILE-GUIDED AND DYNAMIC OPTIMIZATIONS

(75) Inventors: Wei Chung Hsu, Inver Grove Heights, MN (US); Yuan C. Chou, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 525 days.

(21) Appl. No.: 12/152,727

(22) Filed: May 16, 2008

(65) Prior Publication Data

US 2009/0287903 A1 Nov. 19, 2009

(51) Int. Cl.
*G06F 12/00* (2006.01)
(52) U.S. Cl. .............. 711/213; 711/119; 711/E12.001
(58) Field of Classification Search .......... 711/119, 711/213, E12.001
See application file for complete search history.

(56) References Cited

U.S. PATENT DOCUMENTS

| 2007/0150660 A1* | 6/2007 | Marathe et al. ............ 711/137 |
| 2007/0186044 A1* | 8/2007 | Fowles .................... 711/130 |

OTHER PUBLICATIONS

Chou et al., U.S. Appl. No. 11/128,055, filed May 11, 2005, entitled "Method and Structure for Correlation-based Prefetching".
Joseph et al., "Prefetching Using Markov Predictors", 24th International Symposium on Computer Architecture, 1997, pp. 1-11.
Mowry et al., "Design and Evaluation of a Compiler Algorithm for Prefetching", 5th International Conference on Architectural Support for Programming Languages and Operating Systems, 1992, pp. 62-73.
Vanderwiel et al., "Data Prefetching Mechanisms", ACM Computing Survey, Jun. 2000, pp. 1-25.

\* cited by examiner

*Primary Examiner* — Jasmine Song
(74) *Attorney, Agent, or Firm* — Gunnison, McKay & Hodgson, L.L.P.; Forrest Gunnison

(57) ABSTRACT

A computer processor and a method of using the computer processor take advantage of information in the event address register of the computer processor by saving information from the event address register to an event address register history buffer. Thus, the event address register history buffer includes a cluster of events associated with execution of a computer program. The cluster of events is analyzed and the computer program modified, either statically or dynamically, to eliminate or at least ameliorate the effects of such events in further execution of the computer program.

12 Claims, 8 Drawing Sheets

122

| Entry | PC-Location | Address | Latency |
|---|---|---|---|
| 0 | 1x | 0x00640000 | 125 |
| 1 | 2x | 0x00640080 | 33 |
| 2 | 1y | 0x00640040 | 32 |
| 3 | 2y | 0x006400c0 | 32 |
| 4 | 1x | 0x00800000 | 124 |
| 5 | 2x | 0x00800080 | 32 |
| 6 | 1y | 0x00800040 | 124 |
| 7 | 2y | 0x008000c0 | 32 |

EVENT ADDRESS REGISTER HISTORY BUFFERS FOR SUPPORTING PROFILE-GUIDED AND DYNAMIC OPTIMIZATIONS

BACKGROUND OF THE INVENTION

1. Field of the Invention

The present invention relates generally to computer processor performance, and more particularly to automated structures and methods to support profile-guided and dynamic optimizations that in turn improve computer processor performance.

2. Description of Related Art

The performance of today's processors is often limited by the impact of cache misses. Many hardware prefetching schemes have been proposed to reduce cache miss penalties. Some of them are simple and easy to implement, such as next line prefetching, tagged prefetching and stride-based prefetching (See for example, S. P. Vanderwiel and D. J. Lilja, "Data Prefetch Mechanisms," *ACM Computing Survey*, June, 2000, which is incorporated herein by reference as a demonstration of the level of skill in the art), but they are ineffective for more complex but commonly used memory reference patterns such as indirect references and references to dynamic structures. Markov prefetching (See for example, D. Joseph and D. Grunwald, "Prefetching using Markov Predictors", 24*th International Symposium on Computer Architecture*, 1997, which also is incorporated herein by reference as a demonstration of the level of skill in the art) can learn about miss correlations and yield more effective prefetching based on observed correlations among misses. However, such a scheme requires a large amount of on-chip storage to track and remember frequent memory references. This approach may not be cost-effective since the large amount of storage can instead be used to increase the size of cache memory.

Most existing processors support software prefetching. See for example Vanderwiel and Lilja that was referenced above. For example, compilers or programmers may insert prefetch instructions into the generated code to conduct cache prefetching. Software cache prefetching has often been used in scientific and engineering applications where program behavior and data reference patterns are more predictable.

For commercial applications, the effectiveness of software prefetching has been very limited. Although compiler analysis techniques have been proposed to identify possible performance critical cache misses, such analyses are only suitable when the data set size is known at compile time or when the size changes infrequently from one run to the other. See for example, T. Mowry, M. Lam, and A. Gupta, "Design and Evaluation of a Compiler Algorithm for Prefetching" 5*th International Conference on Architectural Support for Programming Languages and Operating Systems*, 1992, which also is incorporated herein by reference as a demonstration of the level of skill in the art.

Currently, software prefetching performed by the compiler is guided mostly by compiler options/flags. It is difficult for a compiler to determine which region/loops are likely to miss the caches. Indiscriminately inserting cache prefetches can significantly degrade performance if the execution of the code actually incurs few cache misses. One way to improve automatic software cache prefetching is to provide accurate cache miss profiles to the compiler or to a runtime optimizer. Current state-of-art Hardware Performance Monitors (HPM) provide cache miss frequency, instruction locations for cache miss events, and addresses of cache miss references. Such information is based on individual events, and can be used to determine the region/loops and the specific instructions that are responsible for frequent cache misses. However, to improve the effectiveness of software cache prefetching, the optimizer needs information about a cluster of misses.

Some new microprocessors, such as the Dual-Core Itanium 2 Processor, available from Intel Corporation, support cache Event Address Registers (EAR) to track the instruction and data addresses of the offending instruction and other useful information about the latest cache miss event. Such event address registers can also be used to track translation lookaside buffer (TLB) miss events or data speculation check events. The event address register records only a single event.

SUMMARY OF THE INVENTION

In one embodiment, a computer processor and a method of using the computer processor both save information from an event address register to an event address register history buffer thereby taking advantage of information in the event address register of the computer processor. The event address register history buffer includes a cluster of events associated with execution of a computer program. The cluster of events is analyzed and the computer program modified, either statically or dynamically, to eliminate or at least ameliorate the effects of such events in further execution of the computer program.

Thus, in one embodiment, a computer program is executed on a processor. During the execution, information in at least one event address register is recorded as an entry in an event address register history buffer. Also, during the execution, entries in the event address register history buffer are analyzed to determine a relationship between at least two of the entries.

Upon determination of such a relationship, a portion of the computer program is modified based upon the relationship. The modified portion of the computer program is placed in the computer program for execution so that the execution performance of the modified computer program is enhanced relative to the execution performance of the unmodified computer program.

In one embodiment, the relationship is a runtime stride usable for at least one of (1) avoiding conflict issues and (2) a guide for prefetching. When the relationship indicates a conflict when prefetching based on the runtime stride, the modifying and placing are not performed to thereby avoid the conflict. Conversely, when the relationship indicating the runtime stride is suitable for use without the conflict, the modifying includes adding a prefetch instruction using the runtime stride.

In another embodiment, the relationship is sequential locality associated with a plurality of pointer chains. For this relationship, the modifying includes inserting a prefetch instruction that utilizes the sequential locality.

In yet another embodiment, the relationship is a correlation between at least two entries in the event address register history buffer. For this relationship, the modifying includes inserting instructions in the computer program so that upon execution of the instructions, a prefetch is performed only when the correlation is true.

In still yet another embodiment, the relationship is a temporal relationship between at least two entries. For this relationship, the modifying includes positioning the entries closer together in a memory space.

In one embodiment, the recording includes a timestamp in the entry. For this embodiment, the relationship is a relationship between timestamps and the modifying includes inserting a prefetch instruction at a location in the computer program based upon the relationship between timestamps.

For this method, the event address register history buffer includes, but is not limited to, an instruction cache event address register history buffer, a data cache event address register history buffer, a branch event address register history buffer, or any combination of these buffers.

In one embodiment, the processor includes a processing unit; a plurality of caches coupled to the processing unit; a plurality of event address registers coupled to the plurality of caches; and an event address register history buffer array including at least one event address register history buffer coupled to the plurality of event address registers to maintain a history of event address register information.

The processor also includes in some embodiments a history buffer timer coupled to the event address register history buffer array. The history buffer timer generates a timestamp for each entry in at least one event address register history buffer.

Also, in some embodiments the event address register history buffer array includes a plurality of event address register history buffers and the plurality includes at least one event address register history buffer.

BRIEF DESCRIPTION OF THE DRAWINGS

FIG. 5 illustrates values in a data cache event address register history buffer embodiment for two chains of instructions having sequential locality according to one embodiment of this invention.

In the drawings, elements with the same reference numeral are the same element or equivalent elements. Also, the first digit of a reference numeral indicates the number of the first drawing in which the element having that reference numeral appeared.

DETAILED DESCRIPTION

In one embodiment of this invention a processor 100 (FIG. 1A) includes an event address register history buffer array 120 of a plurality of event address register history buffers 121 to 123. Each event address register history buffer is used to track a cluster of events. As explained more completely below, recording information for a cluster of events provides correlated information among consecutive events. Such information can be used to improve the accurate prediction of cache misses and to introduce new ways for cache miss predictions.

Figure 1A:
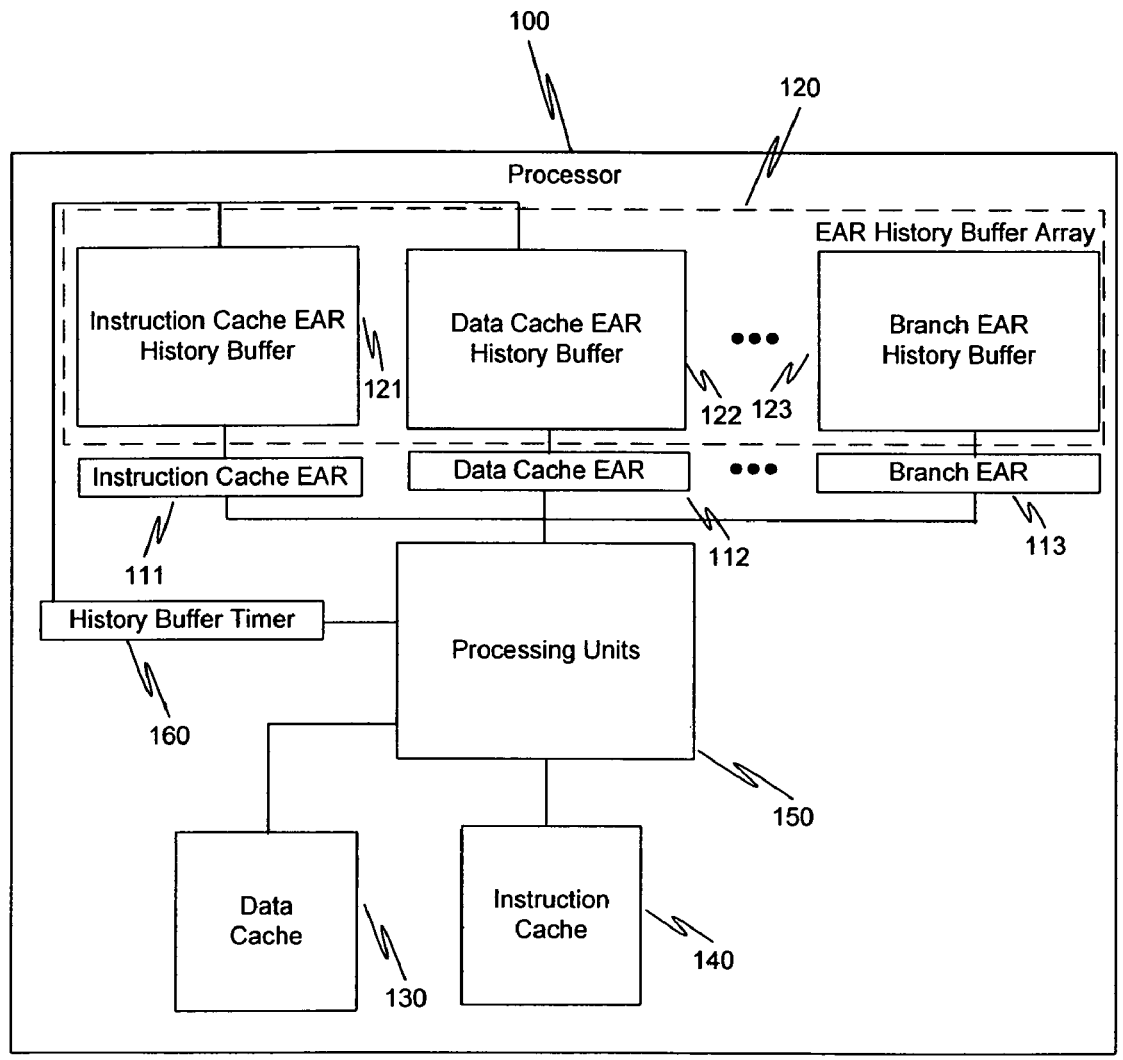
FIG. 1A is a block diagram of a processor that includes an event address register history buffer array that in turn includes a plurality of event address register history buffers according to one embodiment of this invention.

In the embodiment of FIG. 1A, there is an event address register history buffer 121, 122, . . . , 123, for each event address register (EAR), 111, 112 . . . , 113 respectively. Event address register history buffers 121, 122, . . . , 123 are visible to performance monitoring software executing on processing units 150. In an alternative embodiment of FIG. 1B, processor 100A has only one event address register history buffer 125, in array 120A, which is shared by all event address registers (EARs), 111, 112 . . . , 113.

Figure 1B:
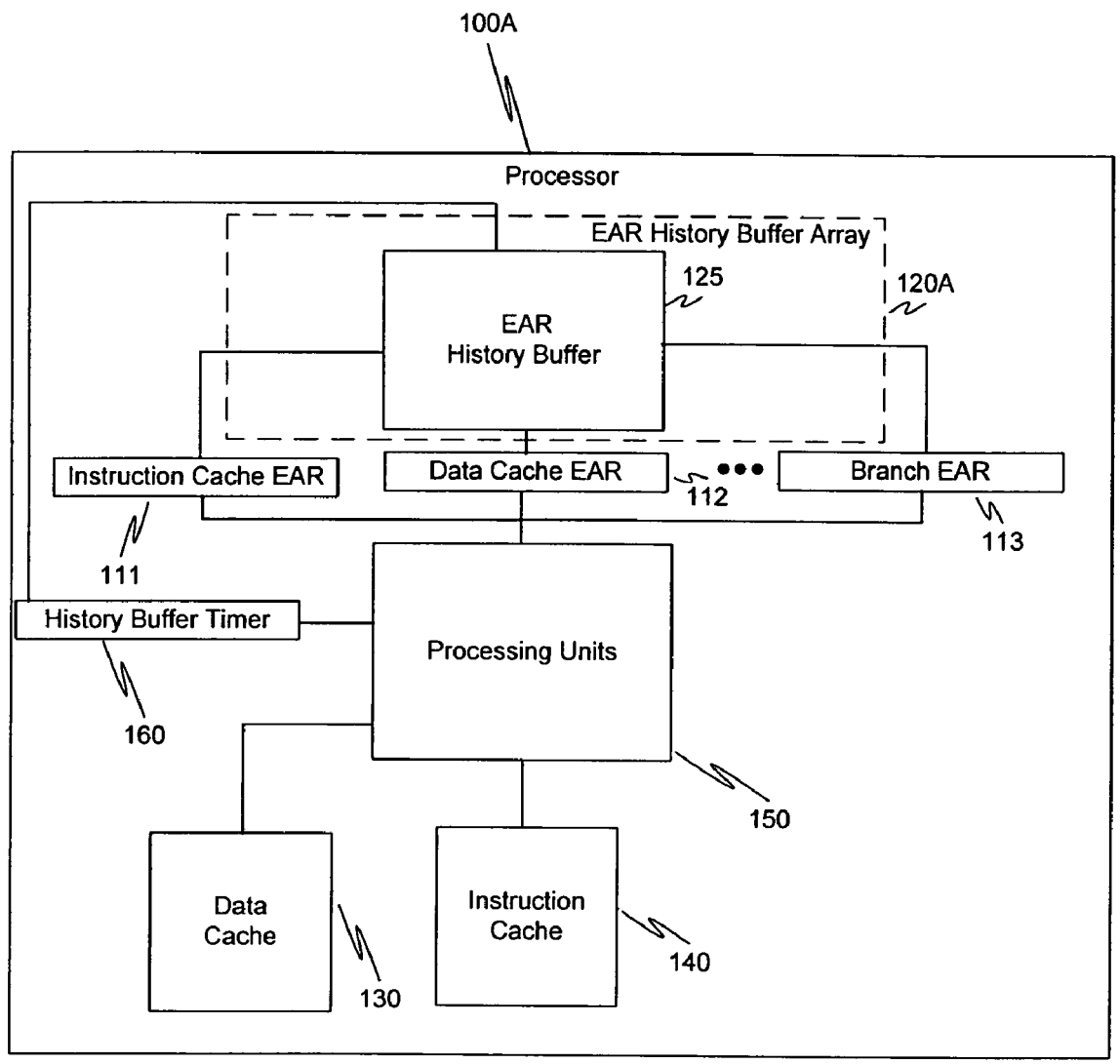
FIG. 1B is a block diagram of a processor that includes an event address register history buffer array that in turn includes a single event address register history buffer according to one embodiment of this invention.

FIGS. 1A and 1B are block diagrams used to illustrate embodiments of the invention. The particular layout of and the number of processing units etc. in a processor are simply lumped together as processing units 150 to avoid distracting from the invention. The fact that the event address registers and event address register history buffers are shown outside the processing units is for ease of illustration only and should not be interpreted as limiting the invention to any particular layout.

In view of this disclosure, those of skill in the art can determine the number and positions of the event address registers and event address register history buffers to provide the appropriate functionality to a processing unit, a cluster of processing units, etc. For example, in one embodiment, the event address (EAR) register is simply the currently addressed entry in the event address register history buffer.

EAR History Buffer array 120 and EAR History Buffer array 120A are used to record event information for any one of or any combination of instruction caches, instruction TLBs, data caches, data TLBs, branch predictors and other microarchitecture features, for example. The number and the length of such EAR History Buffer in array 120 and in array 120A can be implementation dependent.

In one embodiment, each EAR History buffer in array 120 and array 120A is implemented as a circular buffer. When an event occurs, related information such as the PC location of the offending instruction, the data reference address, and the associated latency, and optionally a time-stamp, is written to, i.e., recorded in, a top entry of the appropriate EAR history buffer. After the information is written to that buffer, the pointer to the top entry is moved to the next entry in that buffer.

Since the buffer is circular, if the buffer has a maximum of N entries, where N is an integer number, the N+1 event and each subsequent event will overwrite the oldest entry in that EAR buffer. Thus, in this example, the EAR buffer holds data for the N most recent events.

In one embodiment, to facilitate correlation analysis, timestamps, generated by history buffer timer 160, are recorded in each entry in an EAR history buffer when that entry is recorded. As explained more completely below, this time stamp information is used to determine if there is one or more correlations between nearby events in time.

In one embodiment, history buffer timer 160 is implemented as an N-bit counter. For example, if N is 24, the counter is able to distinguish the timing of events occurring within a 16 million cycle interval. Since a typical dynamic optimization system takes samples at 1 million cycles or smaller intervals, N may not need to be much larger than 20.

To demonstrate the information that can be captured for analysis in array 120, consider the code sequence in Table 1, which is part of a larger computer program that is being executed on processing units 150. When the code sequence in Table 1 is executed, a few instruction cache misses occur for instruction cache 140, as indicated in the last column of Table 1.

TABLE 1

| Program Counter Value | Instruction | |
|---|---|---|
| 4b23c: | std %f44, [%o5 − 8] | |
| 4b240: | ldd [%l5], %f24 | <--- I-cache miss (cache line crossing) |
| 4b244: | cmp %i1, 5 | |
| 4b248: | bl,pn %icc, 0x4b87c | |
| 4b24c: | ldd [%l5 − 8], %f38 | |
| 4b87c: | ldd [%l6 − 8], %f36 | <--- I-cache miss (branch to new line) |
| 4b880: | inc %i5 | <--- I-cache miss (cache line crossing) |

Data for the three instruction cache misses shown in Table 1 are recorded in the Instruction Event Address Register History Buffer 121 as shown in Table 1.1.

TABLE 1.1

Instruction Cache Event Address Register History Buffer 121

| Entry | Program Counter Value | Latency |
|---|---|---|
| 0 | 4b240 | 6 |
| 1 | 4b87c | 6 |
| 2 | 4b880 | 6 |
| 3 | — | — |
| 4 | — | — |

Prior to considering ways to use the information in event address register history buffer array 120, another example is considered. When the code sequence in Table 2 is executed, a few data cache misses occur for data cache 130, as indicated in the last column of Table 2.

TABLE 2

| Program Counter Value | Instruction | |
|---|---|---|
| 4b23c: | std %f44, [%o5 − 8] | <--- L2 Cache Miss |
| 4b240: | ldd [%l5], %f24 | |
| 4b244: | cmp %i1, 5 | |
| 4b248: | ld [%l6], %i6 | <--- L1D Cache Miss |
| 4b24c: | ldd [%l5 − 8], %f38 | |
| 4b250: | ldd [%l0], %f36 | <--- L3 cache Miss |
| 4b254: | fadd %f36, %f38, %f48 | |

Data for the three data cache misses shown in Table 2 are recorded in the Data Cache Event Address Register History Buffer 122 as shown in Table 2.1, where the address is the address of the data to be loaded or stored.

TABLE 2.1

Data Cache Event Address Register History Buffer 122

| Entry | Program Counter Value | Address | Latency |
|---|---|---|---|
| 0 | 4b23c | 0xffff0000 | 25 |
| 1 | 4b248 | 0x00640008 | 6 |
| 2 | 4b250 | 0xffff0100 | 150 |
| 3 | — | — | — |
| 4 | — | — | — |

Prior to considering the optimizations enabled by the use of the information in array 120, techniques for implementing the optimizations are briefly considered. Software program profiling can be divided into static profiling and dynamic profiling. Static profiling, for example, inserts instructions or modifies the location of instructions in a computer program at compile time. Dynamic profiling refers to modifying the computer program at runtime based upon observed dynamic behavior.

Runtime optimization systems can monitor the execution of a program using the process described more completely below If correlated cache misses are detected, the runtime optimizer can extract the loops/regions of the computer program for prefetch insertion or alternatively reorganize the computer program so that the cache misses are associated with a single line in the cache. The newly optimized portions of the computer program are placed in the code cache, and the original binary is patched so that subsequent execution of the code portion is redirected to the code cache. In general, dynamic insertion obtains more accurate information on the locations of the frequent misses since the profiles are collected using the current input data set and executed on the same underlying micro-architecture.

Figure 2:
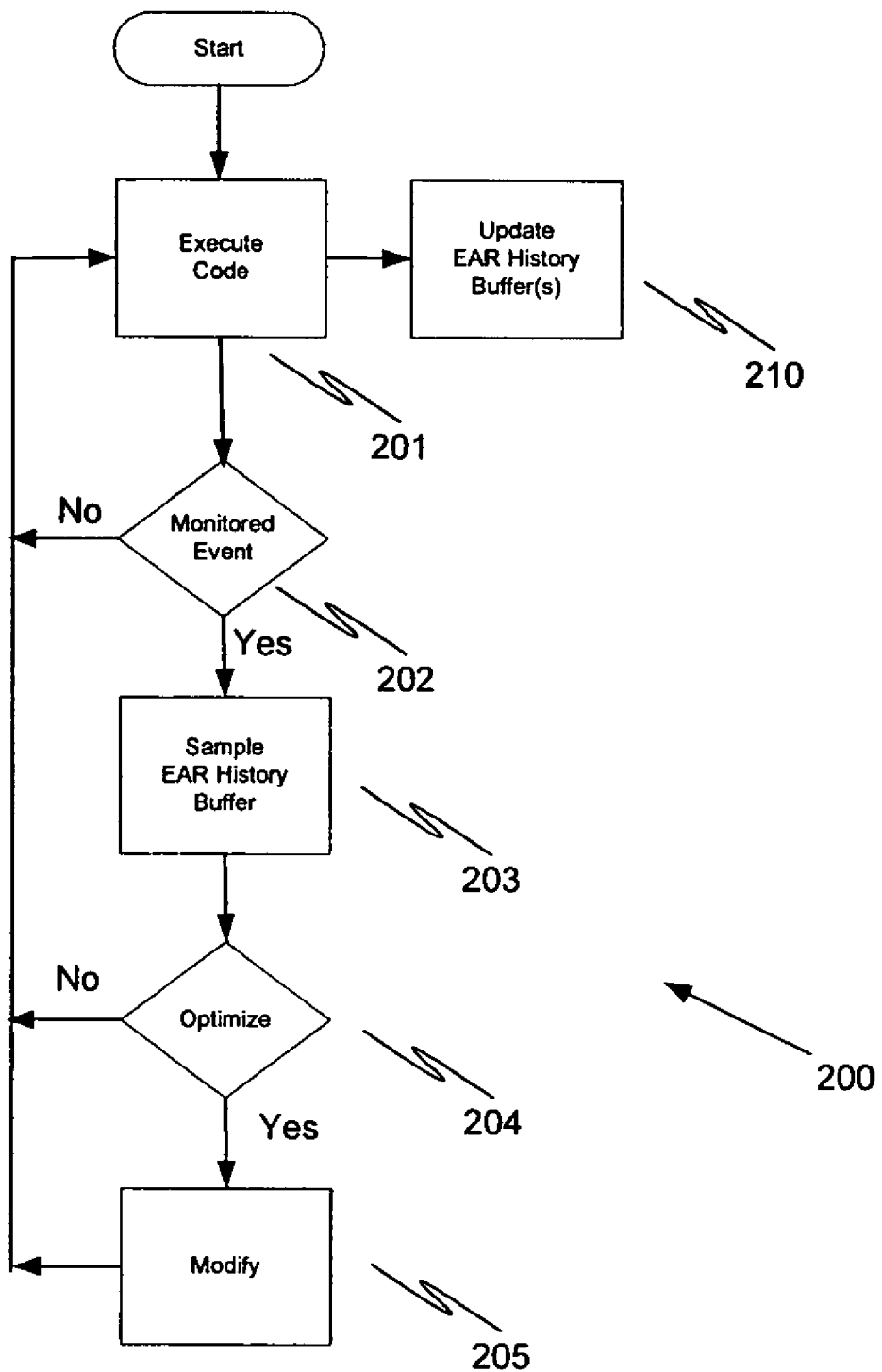
FIG. 2 is a process flow diagram for a method utilizing clusters of information from the event history buffer array to improve performance of execution of a computer program according to one embodiment of this invention.

FIG. 2 is a process flow diagram for one embodiment that utilizes dynamic profiling. In execute operation 201, a computer program is executed. Monitored event check operation 202 makes a determination on whether to sample an EAR history buffer or EAR history buffers. EAR history buffers are sampled at pre-determined intervals for static profiling in one embodiment, and/or adaptively sampled for dynamic profiling in another embodiment.

One process for adaptively sampling in monitor event check operation 202 is to do cache miss sampling, by programming a hardware monitor to generate one interrupt every X number of cache misses, where X can be any positive number such as 1000 or 500000. At each interrupt, a program counter (PC) location associated with the interrupt is obtained and recorded. The recorded PC location is called a hit on the PC. After some time intervals of accumulating hits on PC locations, the PC locations with large hits are considered the delinquent memory operations and the EAR history buffer can be analyzed for possible optimizations.

For instance, the following code segment in TABLE 3 show a sequence of instructions with cumulative hits from cache miss interrupts.

TABLE 3

| Frequency | Program Counter Value | Instruction |
|---|---|---|
| 76102 | 4b220: | ldd [%o3 − 8], %f52 |
| 1800 | 4b224: | std %f44, [%o5 − 8] |
| 63501 | 4b228: | ldd [%l1 − 8], %f60 |

TABLE 3-continued

| Frequency | Program Counter Value | Instruction |
|---|---|---|
| 67402 | 4b22c: | std %f62, [%o2 − 8] |
| 1300 | 4b230: | ldd [%l5 − 8], %f38 |
| 60601 | 4b234: | std %f54, [%g5 − 8] |
| 0 | 4b238: | fnegd %f50, %f40 |
| 900 | 4b23c: | ldd [%l6 − 8], %f36 |
| 61801 | 4b240: | std %f32, [%o0 − 8] |
| 1000 | 4b244: | ldd [%l2 − 8], %f46 |
| 100 | 4b248: | std %f34, [%l7 − 8] |
| 0 | 4b24c: | fmuld %f40, %f36, %f34 |

In this example, the appropriate EAR history buffers would be sampled for the instructions with a frequency great than 60,000, because if these misses can be eliminated, the code execution time should be enhanced.

Every microprocessor has different degree of support for HPM counters. In some microprocessors, the cost of a cache miss may be very different from other misses, depending on the degree of overlap that cache miss has with other cache misses. For this reason, some performance monitoring may select to use cache miss stall cycle count rather than cache miss count to show the cost of cache misses for each instruction.

The information recorded in the EAR history buffer can be used in many different ways to assist optimizations. For example, the sampled EAR history buffer information, sometimes referred as the sampled buffer information, can be processed to detect frequent repeating patterns in optimize check operation 204 and these patterns can be used to guide optimization in modify operation 205, which modifies the original computer program to minimize the effects of the misses.

More specifically, as discussed more completely below, optimizations can be made in modify operation 205 via: A) runtime stride detection to avoid conflicting misses; B) runtime stride detection to guide prefetching for pointer chasing; C) sequential locality detection; D) correlation based prediction; E) memory layout optimization; and F) using timestamps to identify cross-event correlation.

A) Runtime Stride Detection to Avoid Conflict Misses

In the code sequence of TABLE 4, the load instruction has frequent cache misses, and the stride information is stored in register % g1.

TABLE 4

| Program Counter Value | Instruction |
|---|---|
| | ... |
| 4b23c: | ldd [%l5 + %g1], %f24 |
| | ... |

A prior art naive runtime optimizer may decide to generate new code to be stored in the code cache that includes a prefetch instruction for the code segment of Table 4 as follows:

TABLE 5

| Instruction | |
|---|---|
| sll %g1, 2, %g2 | /* shift g1 left by 2, g2=g1*4 */ |

TABLE 5-continued

| Instruction | |
|---|---|
| add %l5, %g2 %g2 | /* %l5 is increased by g1*4, this is to generate a prefetch address 4 iterations ahead */ |
| prefetch [%g2], 0 | /* initiate prefetch 4 iterations ahead */ |
| ldd [%l5 + %g1], %f24 | |

The new code sequence of TABLE 5 works in normal cases. However, since most caches are set associative, if the stride stored in register % g1 happens to be a multiple of the set size, prefetched lines are mapped to the same set for the lines that are currently in use. For example, if the L1 cache is a direct-mapped 4 KB cache, and if the value in register % g1 is 4096, the initiated prefetch is mapped to the same set and replaces the line that would be referenced by the load. In this case, the runtime optimizer should avoid generating prefetches as the prefetches will degrade performance.

When the code segment of TABLE 4 is executed, data for the three data cache misses shown are recorded in the Data Cache Event Address Register History Buffer 122 as shown in Table 6.

TABLE 6

Data Cache Event Address Register History Buffer 122

| Entry | Program Counter Value | Address | Latency |
|---|---|---|---|
| 0 | 4b23c | 0x00001000 | 25 |
| 1 | 4b23c | 0x00002000 | 25 |
| 2 | 4b23c | 0x00003000 | 25 |
| 3 | — | — | — |
| 4 | — | — | — |

With data cache EAR history buffer 122, the information needed to avoid generating prefetches can be derived from the address information column. Here, the stride for each load is seen as 0x00001000, which is 4096. Accordingly, optimize check operation 204 would determine that insertion of a prefetch to avoid the data cache miss would be counterproductive and so execution simply continues without insertion of any prefetches for these data cache misses.

B) Runtime Stride Detection to Guide Prefetching for Pointer Chasing

Pointer chasing is difficult for efficient software prefetching. Due to data dependences, the prefetch addresses for the next iteration cannot be calculated until the data is loaded from memory. However, it is not unusual that a regular stride exists along the pointer reference chain. This behavior is often a side effect of runtime memory allocation that allocates objects sequentially from a heap. When such strides are observed in the EAR history buffer, the dynamic optimizer can attempt to insert prefetches with the dynamically computed strides.

Figure 3:
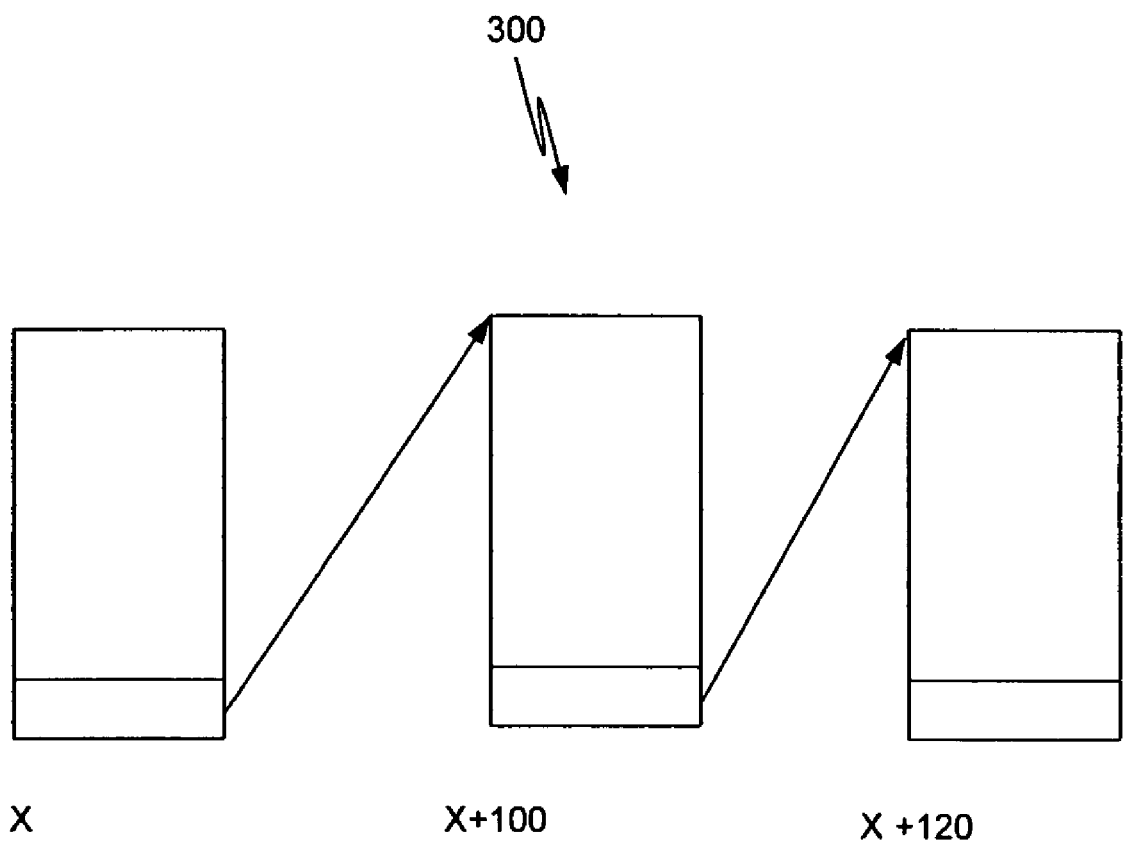
FIG. 3 illustrates a relationship detected between pointers in a linked list using the method of FIG. 2 according to one embodiment of this invention.

A common source of pointer chasing is execution of linked list. In FIG. 3, the first element in list 300 is associated with an address x, the second element has an address of x+100, and the third element has an address of x+120. Note that the program counter value associated with each of the these addresses is typically the same value, although in same cases the values can be different, especially if the loop is unrolled. If different samples of data cache EAR history buffer 122 consistently show these runtime strides of 100 and 120 with respect to address x, optimize check operation 204 would transfer to modify operation 205 that in turn would insert appropriate prefetch instructions for the linked list.

C) Sequential Locality Detection

Figure 4:
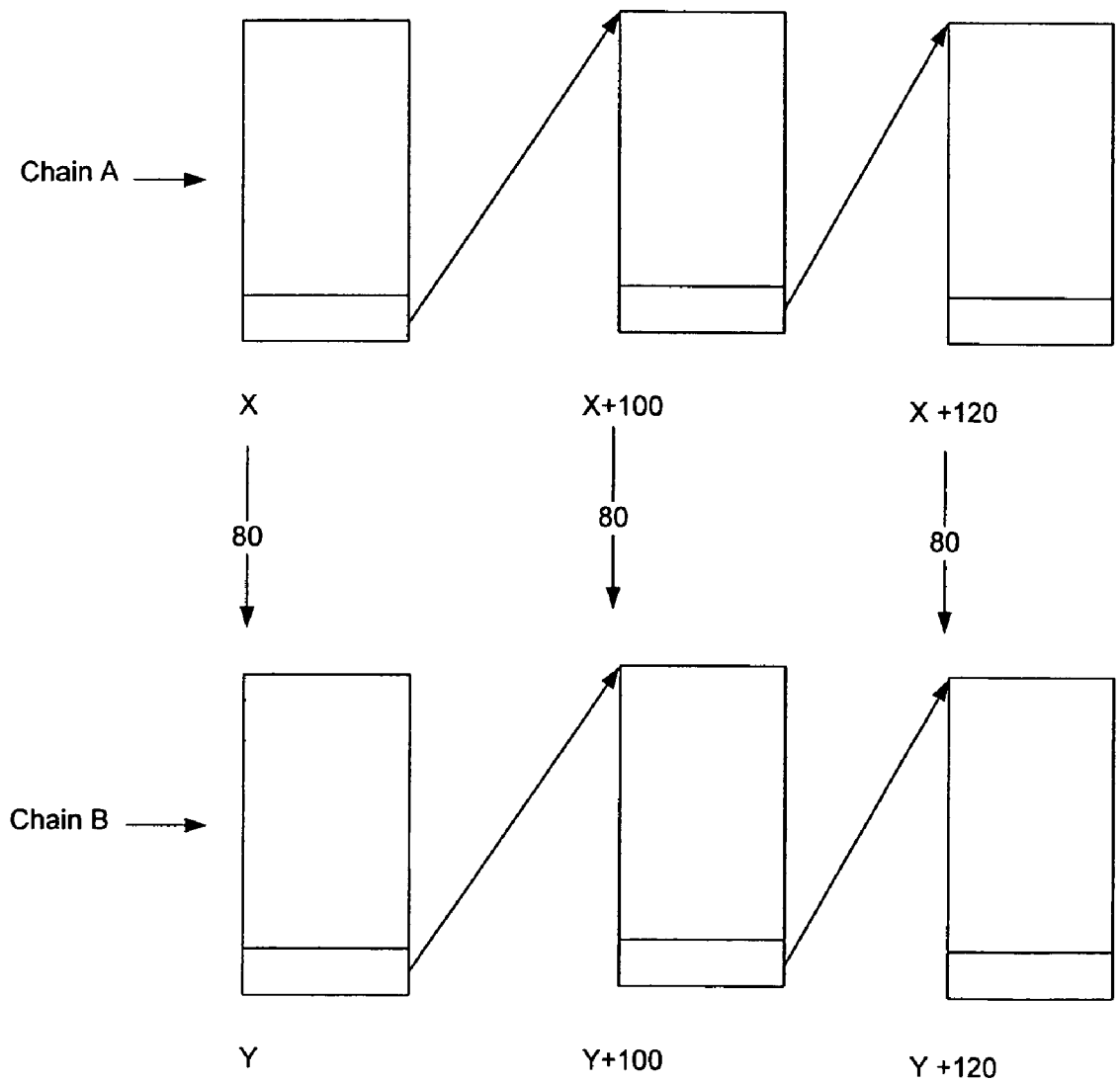
FIG. 4 illustrates a locality relationship between linked lists pointers detected using the method of FIG. 2 according to one embodiment of this invention.

Sequential locality may exist for multiple pointer chasing chains in a program. However, such locality may not be visible at compile time. For example, the references along pointer chains A and B may be both irregular as shown in FIG. 4 but the objects accessed by pointer chain A may be allocated near the objects accessed by pointer chain B. In the example of FIG. 4, the address for each element is chain B is displaced from the corresponding element in chain A by 80. Such sequential locality can be detected sampling the information in data cache EAR history buffer 122. A dynamic optimizer can insert prefetches for the next line (or next few lines) next to instructions accessing objects for pointer chain A.

As another example, consider the code sequence in Table 7.

TABLE 7

| Program Counter Value | | Instructions | |
|---|---|---|---|
| | loop: | | |
| 1x | ld | [%i3 − 8], | %i3 /* chain-A */ |
| | ... | | |
| 2x | ld | [%i5 − 8], | %i5 /* chain-B */ |
| | ... | | |
| 1y | ld | [%i3 + %i4], | %o3 |
| | ... | | |
| 2y | ld | [%i5 − %i4], | %o4 |
| | ... | | |
| | end | | |

An example of the possible content of the data cache event address register history buffer 122 associated with the execution of the instructions in Table 7 is presented in FIG. 5. Each row of buffer 122 includes a PC-location entry 531, a data reference address 532, and a latency 533. Notice that the stride for the addresses within the chains, as indicated by the brackets in FIG. 5, is 0x00000040 or 64 bytes so there is sequential locality within the chains. Also, the stride for the addresses between the same positioned elements in different chains, as indicated by the dotted brackets in FIG. 5 is 0x00000080 or 128 bytes so there is sequential locality between the chains.

Once sequential locality is detected in data cache event address register history buffer 122, the code segment in Table 7 is modified to include prefetch instructions as shown in Table 8.

TABLE 8

| Program Counter Value | Instructions | |
|---|---|---|
| | loop: | |
| 1x | ld [%i3 − 8], %i3 | /* chain-A */ |
| | prefetch [%i3 + 64] | |
| | prefetch [%i3 + 128] | |
| | prefetch [%i3 + 196] | |
| | .... | |
| 2x | ld [%i5 − 8], %i5 | /* chain-B */ |
| | .... | |
| 1y | ld [%i3 + %i4], %o3 | |
| | .... | |
| 2y | ld [%i5 + %i4], %o4 | |
| | .... | |

D) Correlation Based Prediction

Figure 6:
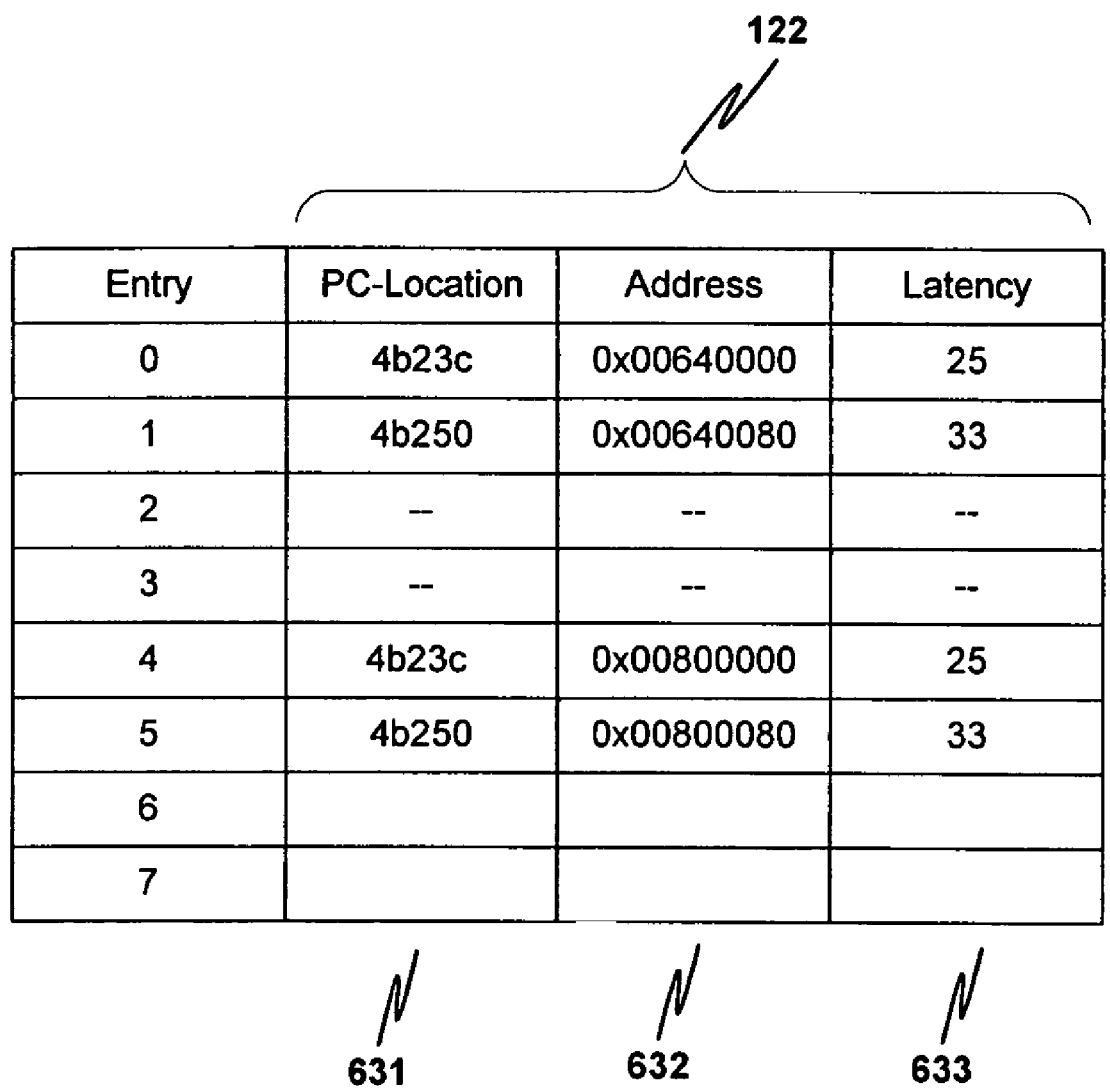
FIG. 6 illustrates values in a data cache event address register history buffer embodiment for determining a correlation in cache misses between two instructions according to one embodiment of this invention.

Correlations often exist among cache misses. Such correlations form the basis for Markov prefetching. Consider the following example: whenever instruction A causes a data cache miss, instruction B also generates a data cache miss as indicated in buffer 122 (FIG. 6). Each row of buffer 122 includes a PC-location entry 631, a data reference address 632, and a latency 633. The PC-location entry 4b23c is for instruction A and the PC-location entry 4b250 is for instruction B. In this case, modify 205 generates a prefetch instruction for instruction B triggered by the data cache miss of instruction A. EAR history buffer makes it possible to detect these correlations easily.

When a correlation between data cache misses is discovered, the computer program is modified to test for the correlation. For example instructions are inserted to determine whether instruction A missed the cache, e.g., the latency for execution of instruction A is determined, and if the latency is greater than the maximum latency for the data cache, the prefetch for instruction B is performed and otherwise the prefetch for instruction B is not performed. One embodiment of a code modification when such a correlated data cache miss is described in and commonly assigned U.S. patent application Ser. No. 11/128,055, entitled "Method and Structure for Correlation-based Prefetching" of Yuan C. Chou and Wei Chung Hsu, filed on May 11, 2005, now U.S. Pat. No. 7,457, 923, which is incorporated herein by reference. Similarly, to detect cache misses associated with a specific value in a register, the event address registers must store register values that can be analyzed and correlated with cache misses as described in U.S. patent application Ser. No. 11/128,055. Finally, if the event address registers include flow control information, the process of U.S. patent application Ser. No. 11/128,055 can be used in analyzing such information.

E) Memory Layout Optimization

If the sampled information from data cache EAR history buffer 122 indicates that some data references are close to each other in time, e.g., the time stamps are close together, a compiler or runtime optimizer can attempt to allocate (or re-allocate) the corresponding data close to each other in memory address space. This may result in multiple cache misses being combined into one cache miss.

F) Using Time-Stamps to Identify Cross-Event Correlation Based Optimizations

With array of EAR history buffers 120, cross-event correlations can be obtained and then correlation-enabled optimizations performed. For example, if a data cache load miss is always followed by a mispredicted branch which in turn is always followed by an instruction cache miss, these correlations can be detected by examining the information including the time stamps in data cache EAR history buffer 122, instruction cache EAR history buffer 121 and branch EAR history buffer 123.

Note that this sequence of events can cause serious performance degradation, especially if the mispredicted branch is dependent on the load miss and therefore cannot resolve for a long time. An instruction cache miss following a mispredicted branch is particularly expensive since the processor's fetch buffer is empty at that point and the latency of the instruction cache miss is fully exposed.

When the code sequence of Table 8 is executed on processing units 150, the information in Tables 8.1., 8.2, and 8.3 is written to data cache EAR history buffer 122, instruction cache EAR history buffer 121 and branch EAR history buffer 123, respectively.

TABLE 8

| Program Counter Value | Instructions |
|---|---|
| 10 | ld [%i3 − 8], %i3 |
| | ... |
| 20 | add %i3, %o2 %i3 |
| | ... |
| 30 | bne %i3, target1 |
| | ... |
| | target1: |
| 40 | ld [%i5], %i5 |
| | ... |
| 50 | |

TABLE 8.1

Data Cache EAR History Buffer 122

| Entry | Program Counter Value | Address | Latency | Time-stamp |
|---|---|---|---|---|
| 0 | 10 | 0x00001000 | 200 | 1000 |
| 1 | | | | |
| 2 | — | — | — | — |
| 3 | — | — | — | — |

TABLE 8.2

Instruction Cache EAR History Buffer 121

| Entry | Program Counter Value | Address | Latency | Time-stamp |
|---|---|---|---|---|
| 0 | 40 | 0x40000000 | 200 | 1100 |
| 1 | | | | |
| 2 | — | — | — | — |
| 3 | — | — | — | — |

TABLE 8.3

Branch EAR History Buffer 123

| Entry | Program Counter Value | Target Address | Taken | Mispredicted | Time-stamp |
|---|---|---|---|---|---|
| 0 | 30 | target1 | yes | yes | 1040 |
| 1 | | | | | |
| 2 | — | — | — | — | |
| 3 | — | — | — | — | |

If the sampled buffer entries repeatedly show the temporal correlation between the data cache miss at instruction 10 and the branch misprediction at instruction 30, and the correlation between this branch misprediction and the instruction cache miss at instruction 40, the optimizer in modify operation 205 can insert an instruction prefetch for instruction 40 just before instruction 10. Alternatively, if the processor supports informing loads, the instruction prefetch can be made contingent on instruction 10 incurring a data cache miss. Specifically, the compiler can use an informing load for instruction 10 which sets a predicate if the instruction misses the data cache. The instruction prefetch for instruction 40 is issued if the predicate is true. The compiler may also choose to insert an instruction prefetch for instruction 34, i.e. the fall-through path of the branch.

Herein, a computer program product comprises a computer readable medium configured to store or transport computer readable code for method 200 or in which computer readable code for method 200 is stored. Some examples of computer program products are CD-ROM discs, DVD discs, flash memory, ROM cards, floppy discs, magnetic tapes, computer hard drives, servers on a network and signals transmitted over a network representing computer readable program code. A tangible computer program product comprises a computer readable medium configured to store computer readable code for method 200 or in which computer readable code for method 200 is stored. Some examples of tangible computer program products are CD-ROM discs, DVD discs, flash memory, ROM cards, floppy discs, magnetic tapes, computer hard drives, and servers on a network.

In view of this disclosure, method 200 can be implemented in a wide variety of computer system configurations using an operating system and computer programming language of interest to the user. In addition, instructions for method 200 could be stored as different modules in memories of different devices. For example, instructions for method 200 could initially be stored in a server computer 780, and then as necessary, a module of the method could be transferred to a client device, e.g., any one of computer system 710, mobile telephone 720, portable computer 760 or PDA 750 and executed on that client device. In this example, server computer 780 includes a display 781, a processor 782, a memory 784 and a network interface 785.

Method 200 is implemented, in one embodiment, using a computer source program. The computer source program may be stored on any common data carrier like, for example, a floppy disk or a compact disc (CD), as well as on any common computer system's storage facilities like hard disks. Therefore, one embodiment of the present invention also relates to a data carrier for storing a computer source program for carrying out the inventive method. Another embodiment of the present invention also relates to a method for using a computer system for carrying out the method. Still another embodiment of the present invention relates to a computer system with a storage medium on which a computer program for carrying out the method is stored.

While method 200 hereinbefore has been explained in connection with one embodiment thereof, those skilled in the art will readily recognize that modifications can be made to this embodiment without departing from the spirit and scope of the present invention.

Those skilled in the art readily recognize that in this embodiment the individual operations, which were mentioned before in connection with method 200, are performed by executing computer program instructions 701 on processor 711 of computer system 710, for example. In one embodiment, a storage medium has thereon installed computer-readable program code 701 for method 200, (FIG. 2) and execution of computer-readable program code 701 causes processor 711 to perform the individual operations explained above.

In one embodiment, computer system 710 is a hardware configuration like a personal computer or workstation. However, in another embodiment, computer system 710 is part of a client-server computer system 700. For either a client-server computer system 700 or a stand-alone computer system 710, memory 712 typically includes both volatile memory, such as main memory, and non-volatile memory, such as hard disk drives.

Figure 7:
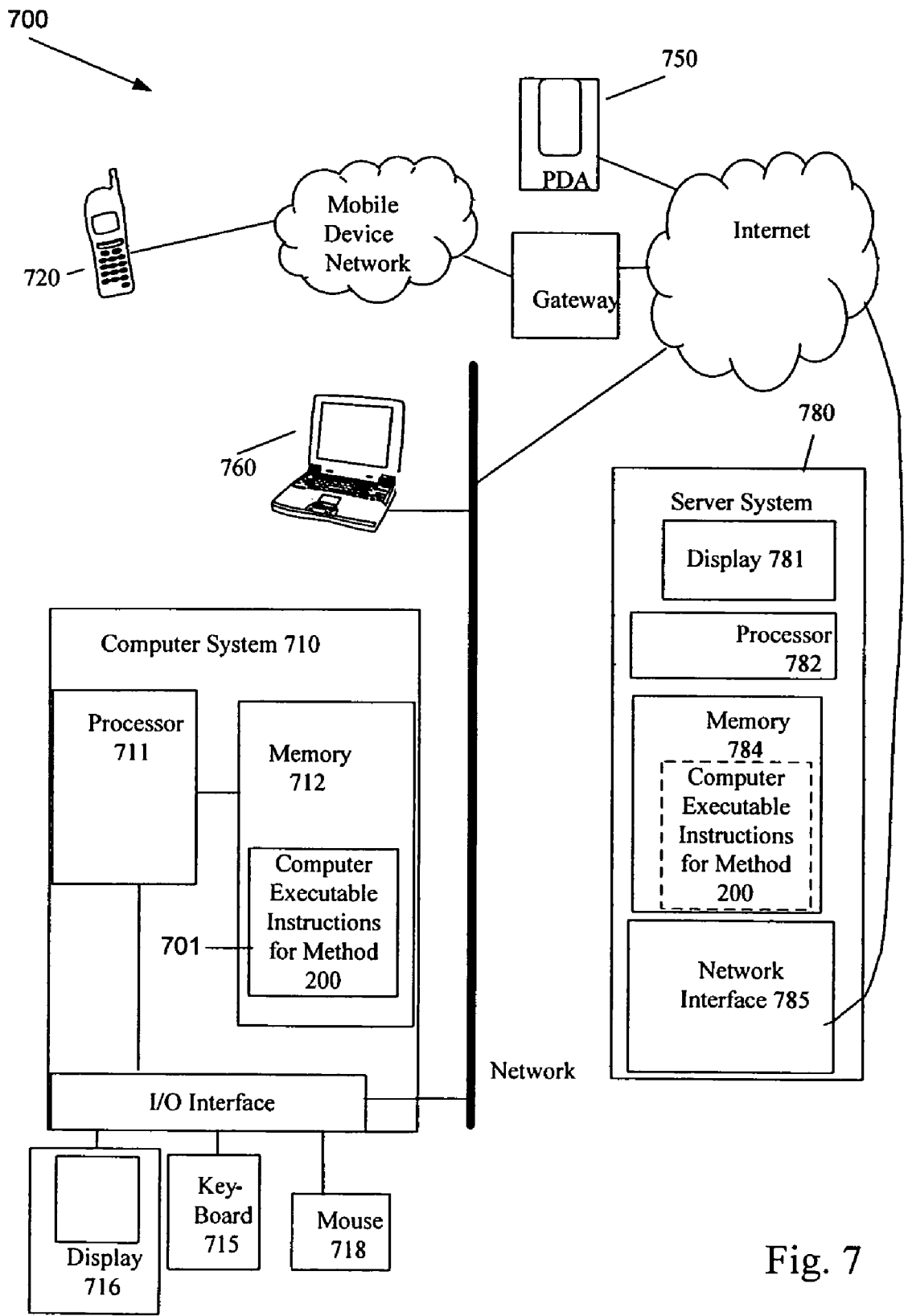
FIG. 7 is a diagram of a system and components suitable for carrying out embodiments of this invention.

While memory 712 is illustrated as a unified structure in FIG. 7, this should not be interpreted as requiring that all memory in memory 712 is at the same physical location. All or part of memory 712 can be in a different physical location than processor 711. For example, instructions 701 may be stored in memory, e.g., memory 784, which is physically located in a location different from processor 711.

Processor 711 should be coupled to the memory containing instructions 701. This could be accomplished in a client-server system, or alternatively via a connection to another computer via modems and analog lines, or digital interfaces and a digital carrier line. For example, all of part of memory 712 could be in a World Wide Web portal, while processor 711 is in a personal computer, for example.

More specifically, computer system 710, in one embodiment, can be a portable computer, a workstation, a server computer, or any other device that can execute method 200. Similarly, in another embodiment, computer system 710 can be comprised of multiple different-computers, wireless devices, server computers, or any desired combination of these devices that are interconnected to perform, method 200 as described herein.

Herein, a computer memory refers to a volatile memory, a non-volatile memory, or a combination of the two. Similarly, a computer input unit, e.g., keyboard 715 and mouse 718, and a display unit 716 refer to the features providing the required functionality to input the information described herein, and to display the information described herein, respectively, in any one of the aforementioned or equivalent devices.

We claim:

1. A computer-based method comprising:
   executing a computer program on a processor;
   recording, during said executing, information in at least one event address register as an entry in an event address register history buffer;
   analyzing, during said executing, entries in said event address register history buffer to determine a relationship between at least two of said entries; and
   modifying a portion of said computer program based upon said relationship; and
   placing said modified portion of said computer program in said computer program for execution in said executing.

2. The computer-based method of claim 1 wherein said relationship is sequential locality between a first pointer chain and a second pointer chain,
   wherein the first pointer chain is different from the second pointer chain,
   wherein an address for each element in the first pointer chain is displaced by a constant displacement from an address of a corresponding element in the second pointer chain, and
   wherein said modifying comprises inserting a prefetch instruction that utilizes said sequential locality.

3. The computer-based method of claim 1 wherein said relationship is a correlation between an entry for a first instruction and an entry for said second instruction in said event address register history buffer, wherein said second instruction executes after said first instruction executes and said modifying comprises inserting at least one instruction in said computer program between said first instruction and said second instruction so that upon execution of said first instruction, a prefetch is performed only when said correlation is true.

4. The computer-based method of claim 1 wherein said relationship is a temporal relationship between at least a first entry for a first data reference in the event address register history buffer and a second entry for a second data reference in the event address register history buffer, and said modifying comprises positioning first and second data, referenced by said first and second data references respectively, closer together in a memory space.

5. The computer-based method of claim 1 wherein the event address register history buffer is a data cache event address register history buffer, and wherein said recording further comprises:
   recording, during said executing, information in a second event address register as an entry in a branch event address register history buffer;
   including a timestamp for each entry in the data cache event address register history buffer and for each entry in the branch event address register history buffer, wherein the timestamp for an entry represents a time associated with that entry,
   wherein said relationship is a relationship between timestamps of an entry in the data cache event address register history buffer and an entry in the branch event address register history buffer, and
   wherein said modifying comprises inserting a prefetch instruction at a location in said computer program based upon said relationship between timestamps.

6. The computer-based method of claim 1 wherein said event address register history buffer is an instruction cache event address register history buffer.

7. The computer-based method of claim 1 wherein said event address register history buffer is a data cache event address register history buffer.

8. The computer-based method of claim 1 wherein said event address register history buffer is a branch event address register history buffer.

9. A computer-based method of comprising:
   executing a computer program on a processor;
   recording, during said executing, information in at least one event address register as an entry in an event address register history buffer;
   analyzing, during said executing, entries in said event address register history buffer to determine a relationship between at least two of said entries; and
   modifying a portion of said computer program based upon said relationship; and
   placing said modified portion of said computer program in said computer program for execution in said executing,
   wherein said relationship is a runtime stride usable for at least one of (1) avoiding conflict issues and (2) a guide for prefetching,
   wherein upon said relationship indicating a conflict when prefetching based on said runtime stride, said modifying and placing are not performed to thereby avoid said conflict; and
   upon said relationship indicating said runtime stride is suitable for use without said conflict, said modifying comprises adding a prefetch instruction using said runtime stride.

10. A processor comprising:
    a processing unit;
    a plurality of caches, coupled to said processing unit, including an instruction cache and a data cache;
    a plurality of event address registers coupled to said plurality of caches, wherein said plurality of event address registers includes an instruction cache event address register, a data cache event address register, and a branch event address register; and
    an event address register history buffer array including:
       an instruction cache event address register history buffer coupled to the instruction cache event address register to maintain a history of information in the instruction cache event address register;

a data cache event address register history buffer coupled to the data cache event address register to maintain a history of information in the data cache event address register; and a branch event address register history buffer coupled to the branch event address register to maintain a history of information in the data cache event address register.

11. The processor of claim 10 further comprising:

a history buffer timer coupled to the instruction cache event address register history buffer and to the data cache event address register history buffer in said event address register history buffer array, wherein said history buffer timer generates a timestamp for an event and the timestamp is written for that event in one of the instruction cache event address register history buffer and the said data cache event address register history buffer when the event occurs.

12. A tangible computer program product comprising a computer readable medium configured to store computer readable code for a method comprising:

recording, during executing a computer program, information in at least one event address register as an entry in an event address register history buffer;

analyzing, during said executing a computer program, entries in an event address register history buffer to determine a relationship between at least two of said entries; and modifying a portion of said computer program based upon said relationship; and placing said modified portion of said computer program in said computer program for execution in said executing a computer program.

\* \* \* \* \*